(12) United States Patent
Waerstad et al.

(10) Patent No.: US 11,511,583 B2
(45) Date of Patent: Nov. 29, 2022

(54) SUSPENSION SYSTEM

(71) Applicants: Kjell Robt Waerstad, Brookline, MA (US); Hilde Marie Waerstad, Brookline, MA (US)

(72) Inventors: Kjell Robt Waerstad, Brookline, MA (US); Hilde Marie Waerstad, Brookline, MA (US)

( * ) Notice: Subject to any disclaimer, the term of this patent is extended or adjusted under 35 U.S.C. 154(b) by 0 days.

(21) Appl. No.: 17/221,878

(22) Filed: Apr. 5, 2021

(65) Prior Publication Data
US 2022/0314722 A1 Oct. 6, 2022

(51) Int. Cl.
*B60G 11/26* (2006.01)

(52) U.S. Cl.
CPC ........ *B60G 11/26* (2013.01); *B60G 2800/012* (2013.01)

(58) Field of Classification Search
CPC .............. B60G 11/26; B60G 2800/012; B60G 17/0152; B60G 2202/15; B60G 2202/24
See application file for complete search history.

(56) References Cited

U.S. PATENT DOCUMENTS

| | | | |
|---|---|---|---|
| 3,779,535 A * | 12/1973 | Strand | B60G 21/073 267/64.15 |
| 4,345,661 A | 8/1982 | Nishikawa | |
| 4,678,203 A * | 7/1987 | Rohner | B60G 17/0528 280/124.157 |
| 4,848,790 A | 7/1989 | Fukunaga | |
| 5,149,131 A | 9/1992 | Sugasawa | |
| 5,364,122 A * | 11/1994 | Ichimaru | B60G 17/016 280/5.514 |
| 5,401,053 A * | 3/1995 | Sahm | B60G 17/016 267/221 |
| 5,785,344 A * | 7/1998 | Vandewal | B60G 17/0152 280/124.112 |
| 7,234,576 B2 * | 6/2007 | Sirven | B60G 17/08 188/322.15 |
| 7,472,914 B2 | 1/2009 | Anderson | |
| 2004/0061292 A1 | 4/2004 | Hall | |
| 2005/0225050 A1 * | 10/2005 | Mizuno | B60G 21/06 280/124.158 |
| 2007/0187918 A1 | 8/2007 | Mizuno | |

(Continued)

FOREIGN PATENT DOCUMENTS

| | | | |
|---|---|---|---|
| DE | 3533540 A1 * | 4/1986 | |
| DE | 4211628 A1 * | 10/1993 | ......... B60G 17/0162 |

(Continued)

*Primary Examiner* — James A English
*Assistant Examiner* — Kurtis Nielson
(74) *Attorney, Agent, or Firm* — Lambert Shortell & Connaughton; David J. Connaughton, Jr.; Justin P. Tinger

(57) ABSTRACT

A suspension system for a vehicle is provided. The system utilizes pistons, one on each side of the vehicle, engaged with a vehicle body at a distal end and having a fluid chamber at the proximal end. The system further has a central chamber having a rod freely laterally moving therein. A fluid communicates between the central chamber and each piston fluid chamber. Upon nonlinear forces applied to the vehicle, the rod is urged in one direction or another. This urging applies force to the fluid in the central chamber, and in turn, to the piston in the corresponding side of the vehicle, urging the piston up and in turn urging the vehicle body up.

16 Claims, 4 Drawing Sheets

(56) References Cited

U.S. PATENT DOCUMENTS

| | | |
|---|---|---|
| 2008/0272561 A1 | 11/2008 | Monk |
| 2009/0140501 A1* | 6/2009 | Taylor .................... B60G 21/06 |
| | | 280/5.508 |
| 2010/0044976 A1 | 2/2010 | Rades |
| 2011/0068552 A1 | 3/2011 | Ryan |
| 2013/0099456 A1 | 4/2013 | Oshita |
| 2014/0107892 A1 | 4/2014 | Coombs |
| 2014/0217693 A1* | 8/2014 | Schmidt ................ B60G 11/26 |
| | | 280/124.162 |
| 2016/0016451 A1* | 1/2016 | Izak ....................... B60G 17/00 |
| | | 280/5.503 |
| 2018/0257764 A1 | 9/2018 | Gandhi |

FOREIGN PATENT DOCUMENTS

| | | | |
|---|---|---|---|
| DE | 10348273 A1 * | 5/2005 | ............. B60G 21/05 |
| EP | 2000336 | 12/2008 | |
| EP | 2000336 A1 * | 12/2008 | ......... B60G 17/0162 |
| WO | 9523076 | 8/1995 | |
| WO | WO-2006130077 A1 * | 12/2006 | ............... B60G 5/06 |
| WO | 2014128713 | 8/2014 | |

\* cited by examiner

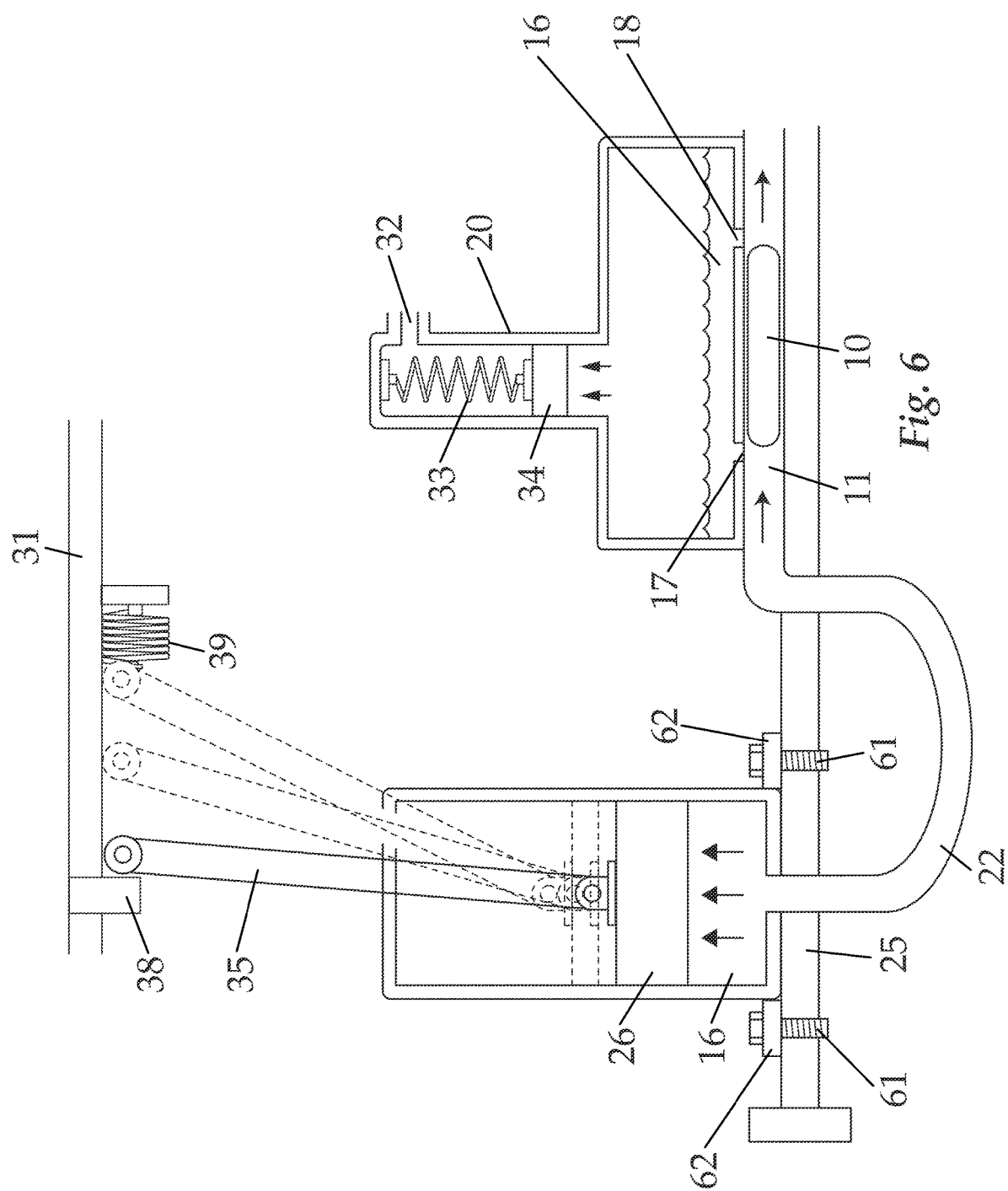

SUSPENSION SYSTEM

BACKGROUND

Technical Field

The present disclosure relates generally to suspension systems. More particularly the present disclosure relates to a vehicle suspension system which keeps the vehicle upright and stable when moving in a nonlinear direction.

Description of Related Art

Suspension systems currently used in most cars rely on springs to counterbalance the weight and load of the car, and on shock absorbers to smooth out the up and down movements of the wheels. Coil springs are mostly used in passenger cars, while leaf springs, that can carry heavier loads, may be used in heavy trucks and equipment vehicles.

One drawback with the present suspension designs is that the springs get compressed under heavy loads, and by the combined action of gravity and centrifugal forces. The springs then lose their ability to absorb the energy levied on them when the car hits a bump or potholes in the road. The energy stored in the spring may suddenly be released when the wheel passes the bump, causing the spring to oscillate violently up and down momentarily. This action is imparted to the wheel, which may for a brief moment lose contact with the ground, and you may lose control of the vehicle. The situation is particularly precarious if you should hit a bump while negotiating a sharp curve in the road. The car will be subject to a centrifugal force that will resist the change in the direction of the car. This force is acting outward from the center of gravity, and when combined with the weight of the car, will move the center of gravity to one side in the direction of the centrifugal force.

Both forces act to compress the springs and tires on one side of the car. If the centrifugal force becomes greater than the weight of the car, it will start to pivot about the point where the wheel makes contact with the road, lifting the other side of the car off the ground. The car would be in the first phase of a rollover in the making. Any extra momentum received from bumps or potholes in the road may finish the job.

Vehicles with high profiles, such as SUVs, light trucks, busses, vans and heavy trucks are particularly prone to rollovers. The threshold for passenger cars is about 1 G (9.8 meter/second$^2$). Light trucks will roll over at about 0.8 G, and large commercial tucks will roll over at lateral acceleration as low as 0.2 G. Vehicles with relatively high ground clearance are in general more susceptible to rollovers.

Statistics from the National Traffic Safety Adm. (NHTSA) show that more than 280,000 rollover accidents are reported each year, claiming more the 10,000 lives annually in the USA. Considering this grim statistics from the NHTSA, the need for a new suspension system is clear.

Therefore, what is needed is a suspension system which can provide stability and balance in potential rollover situations.

SUMMARY

The subject matter of this application may involve, in some cases, interrelated products, alternative solutions to a particular problem, and/or a plurality of different uses of a single system or article.

In one aspect, a vehicle suspension system is provided. The suspension system has a left piston assembly and a right piston assembly. The left piston assembly has a housing and a piston movable within the housing. The right piston assembly has a housing and a piston movable within the housing. A central chamber is in fluid communication with the left piston housing and right piston housing via a right side fluid flow path connecting the central chamber to the right piston housing, and a left side fluid flow path connecting the central chamber to the left piston housing. Fluid at least partially, and preferably fully fills the left and right side flow paths. A rod is positioned within the central chamber and movable laterally towards the left piston assembly and towards the right piston assembly within the central chamber. Upon application of a lateral force, the laterally movable rod applies a force to one of the right side fluid flow path or the left side fluid flow path, the force causing the fluid having force applied to apply a force to the corresponding left or right side piston within the left or right side piston housing. This in turn provides an upward force to the side of the cornering vehicle to counter the gravity and centrifugal forces which are urging that side of the vehicle to tip downward.

In another aspect, vehicle comprising the suspension system disclosed above is provided. The suspension system allows movement of wheels of the vehicle relative to a body of the vehicle, and provides improved stability during cornering and other nonlinear travel of the vehicle.

BRIEF DESCRIPTION OF THE DRAWINGS

FIG. 6 provides a partial view of another embodiment of the suspension system disclosed herein.

DETAILED DESCRIPTION

Figure 1:
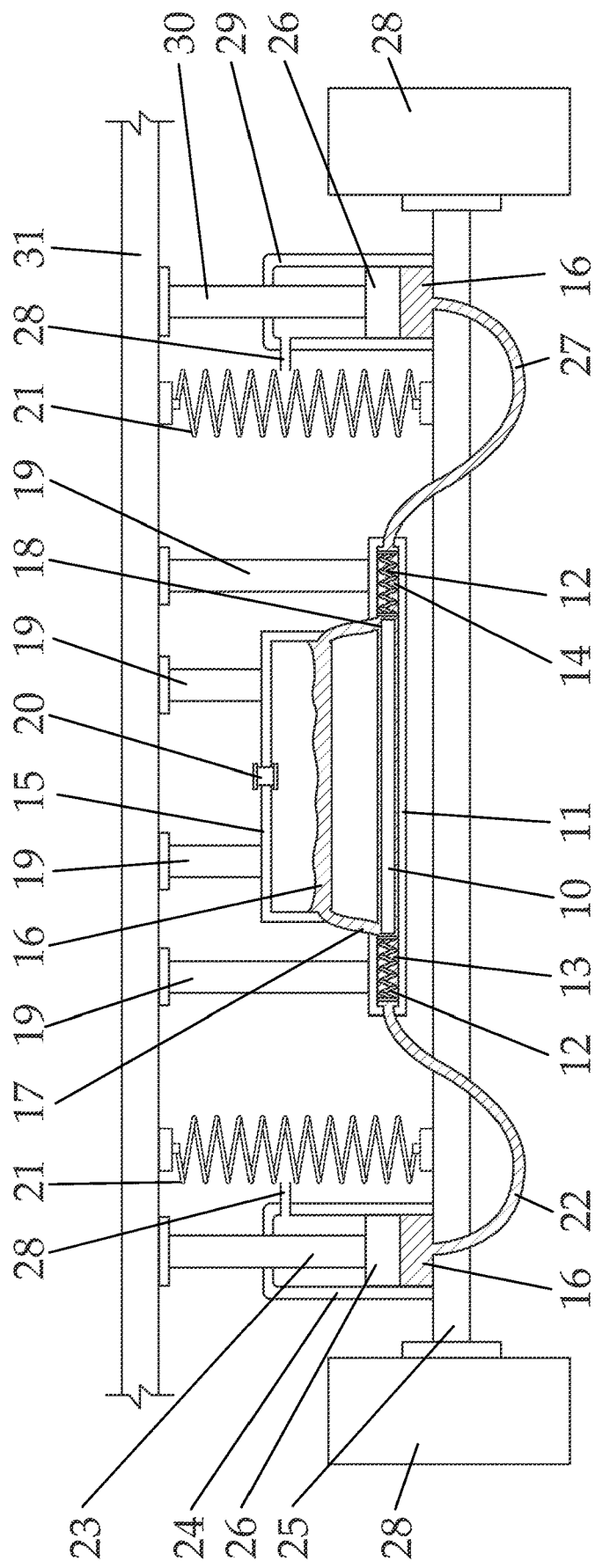
FIG. 1 provides a view of an embodiment of the suspension system disclosed herein.

The detailed description set forth below in connection with the appended drawings is intended as a description of presently preferred embodiments of the invention and does not represent the only forms in which the present disclosure may be constructed and/or utilized. The description sets forth the functions and the sequence of steps for constructing and operating the invention in connection with the illustrated embodiments.

The present disclosure relates to a new suspension system based on a concept in fluid mechanics known as Pascal's Principle. When this system is applied to vehicles moving in a nonlinear direction, the combined force of gravity and centrifugal forces acting on the vehicle can be counterbalanced with an equal and opposite force that will keep the vehicle upright and stable at almost at any speed. The system also has a dampening effect on the up and down movements of the wheels, and may replace, or augment, the shock absorbers used in conventional suspension systems.

Pascal's Principle can be explained as follows: If two cylinders are connected by a common fluid, the pressure applied to the fluid in one of the cylinders is imparted to the fluid in the other cylinder through the fluid connecting them. However, because pressure is equal to force per unit area, the cylinder that has a larger area will experience a force multiplication effect. Pascal's Principle may be restated as:

$$f(2)=f(1) \times a(2)/a(1) \qquad (1)$$

Where: f(1) is the force applied to a piston in cylinder 1 a(1) is the area of the cross section of piston 1 f(2) is the resulting force applied to the piston 2 a(2) is the area of the cross section of piston 2

Generally, the present disclosure concerns a suspension system for a vehicle. The suspension system is particularly designed for improving stability when cornering and otherwise moving the vehicle in a non-linear direction to offset the rolling forces experienced during such maneuvers. The suspension system includes two piston housings, one for each side of the vehicle which engages with the axel and frame of the vehicle. The piston housing has a piston movable within the housing, with a piston head at a proximal end within the housing, and a distal end attached or attachable to the vehicle frame. In most embodiments, each piston housing is vented to atmosphere opposite to the piston head, though other configurations are certainly possible. A central chamber is positioned at or near the middle of the vehicle between the left and right piston housings. The central chamber contains a freely movable rod which can slide left or right under influence of the centrifugal force acting upon it when the vehicle is traveling in a non-linear direction. The chamber and rod define a first volume on the left side of the rod and a second volume on the right side of the rod. The left and right piston housings have a fluid at a bottom adjacent to the piston heads, the fluid is in fluid communication with the central chambers via left and right fluid flow paths (typically tube, hose, piping, or the like). In one embodiment, springs may be positioned on each side of the rod to return it to a neutral central position when a lateral force is not acting on the rod.

Upon a rightward force being applied to the rod, the rod applies force to the fluid on its right side, which in turn applies force to the piston head in the right piston assembly. This in turn urges the vehicle frame upward by its connection or engagement with the piston. The same operation applies upon a leftward force being applied to the rod, causing the left piston, and in turn frame, to be urged upwardly. The pistons of the left and right piston housings are free to move up or down depending on the pressure of the hydraulic fluid beneath them. The piston of each piston housing has a larger cross sectional area compared to the rod face. According to Pascal's principle, the larger surface area piston will experience a force multiplication effect as can be calculated from equation 1.

In some embodiments, the suspension system includes an upper fluid reservoir. The upper fluid reservoir is partially filled with fluid and this fluid can drain into both the first and second volumes in the central chamber when the rod is in a neutral position, unless the rod is blocking a fluid connection between central chamber and reservoir. Upon action of a force on the rod, it may be drawn left or right, and may cut off fluid flow from the reservoir to the corresponding volume, while allowing fluid flow to the other volume. This provides improved operation and also works to continuously lubricate the rod as it moves back and forth. The upper fluid reservoir also provides a positive pressure of fluid to urge the fluid into the volume, fluid flow paths, and piston housings. In a particular embodiment of the reservoir, the reservoir may be equipped with a drain plug and filling port (which may be the same or different) to allow for removing or adding fluid. In a further embodiment, a valve may be operable to maintain a constant above-atmospheric pressure within the reservoir tank. This may be achieved by, for example a weighted piston and spring valve.

In some embodiments, the piston distal end may be fixedly or pivotally connected or connectable to the frame of the vehicle. In another embodiment, the piston distal end may have a laterally slideable connection to the frame, connecting on a track and being able to slide along it. In such an embodiment, the piston can pivot relative to the head on the proximal end. At rest, the distal end of the piston is at a slight angle off vertical. Upon an upward force on the head of the piston, the distal end has both an upward and directional vector. This distal end is mounted to a track on the frame and as the piston head moves upward, the angle of the piston increases as it slides along the track at its distal end. A spring may be arranged to urge the distal end of the piston away from an angled orientation, in turn pushing the piston head downward. Such an arrangement allows for more active motion of the piston head. Other embodiments such as a spring loaded piston and the like may be employed to allow for piston motion without requiring the equal motion of the frame of the vehicle.

When a vehicle is moving in a nonlinear direction there will be a centrifugal force acting upon it, causing the vehicle to lean to one side. This force can be considerable when the car is making sharp turns, and can in extreme cases cause the car to turn over. The centrifugal force FC, acting on a body with mass m, moving in a circular path of radius r, at speed v can be calculated from Newton's equation:

$$FC=m(v^2)/r \qquad (2)$$

The system disclosed herein will counteract the centrifugal and gravity forces experienced by the vehicle in motion and keep the car stable in an upright position at almost any speed.

Using some reasonable figures into formulas (1) and (2) we can calculate the force effects on a vehicle, allowing the impact of the suspension contemplated herein to be seen.

Consider a car traveling at 30 meters per second, or about 66 miles per hour. It runs into a curve in the road that can be considered a section of a circle with radius 10 meters, or about 33 feet. The car is turning in a clockwise direction. Let the mass of the rod in central chamber be 10 kilo grams, or 22 pounds. The centrifugal force acting on the rod can be calculated from formula (2): FC=10 kg(30 m/s)$^2$/10 m=900 kgm/(s$^2$)=900 Newton, or 203 lbs, or 92 kg (1 N=0.225 lbs).

Let the cross section of the rod be 1 square inch, which would impart a pressure of 203 pounds per square inch (psi) in piston housings, under the conditions given above.

Let us consider the cross section of piston head to be 20 square inches and calculate the force acting on this piston using formula(1):f(2)=203(20/1)=4104 lbs, or 1865 kg.

These values are probably higher than what is desired for a regular car, but may be needed in racing cars. They can be adjusted by choosing the right cross section ratios between the piston and rod, or by adjusting the weight of rod.

There are normally two independent forces acting on a vehicle in motion. The weight of the car can be considered a force vector originating at the gravity center of the car pointing vertically downward, and the centrifugal force vector acting in a horizontal direction outward from the center of gravity. The resultant force will be a vector pointing at an angle from the vertical direction.

The exact angle being dependent on the relative force strength between the weight of the car and the centrifugal force. It would therefore be an advantage to have the piston shafts leaning inwards to the center of the car, and preferably being able to pivot at the connections to the pistons and the car frame. Such embodiments may be used in any of the various embodiments disclosed herein.

When the centrifugal force acting on the car exceeds the weight of the car it is the friction between the tire and the road that keeps the car on the road. If this friction is diminished, as would be the case on icy roads, the car may slide to the side and you would lose control of the car.

Consider a car weighing 1980 pounds, or 900 kg, traveling at 56 miles per hour, or 25 meters per second. It runs into a curve in the road which can be considered a section of a circle with radius of 200 feet, or 61 meter. The centrifugal force acting on the car can be calculated from equation (2). It is 9221 Newton, or 2075 lb. or 943 kg. The combined force of gravity and centrifugal forces would be 2868 lb. or 1303 kg. Let the weight of rod in central chamber be 88 lb. or 40 kg, and the cross section of the piston be one square inch respectively. The centrifugal force acting on the rod can be calculated from equation (2). It is 92.2 lb. or 41.9 kg. It would impart a pressure of 92.2 pounds per square inch (92.2 psi) in central chamber. That pressure is transferred to the liquid in piston chamber. Under the conditions given above the area of the cross section of piston head would have to be 31.1 square inches with a cross section radius of 3.1 inches, in order to counterbalance the combined centrifugal and gravity forces. But considering that the weight of the car is distributed between the front and the rear axles the weight of rod, or the area of piston head could be much smaller where you have a suspension system applied to both axels. The same numbers presented above would also apply to the car traveling at 112 miles per hour in a 400 feet radius curve.

The rod in the central chamber and the piston heads in the piston housings may be equipped with sealing springs of the type used for pistons in most internal combustion engines.

Turning now to FIG. 1, and embodiment of the suspension system contemplated herein is shown. The suspension system is shown attached to the vehicle and engaged with vehicle frame 31 and axle 25. At each side near a wheel 28 is a left piston housing 24 and right piston housing 29. Each piston housing contains a part of the piston 23, 30 which is slideable in and out of the piston housing. Each piston has a piston head 26 which separates one side of the housing from another. As can be seen, upon application of force to the piston head 26, the piston head will apply force to the corresponding piston 23, 30 which will in turn apply force to the vehicle frame 31. In this embodiment, coil springs 21 are used in addition and as part of the vehicle suspension system, but in other embodiments these may be omitted.

A centrally located chamber 11 is attached to the vehicle frame 31 (or in other embodiments, the axle 25 or other part of the vehicle). The chamber 11 defines an interior space. Within this interior space is a rod 10. This rod 10 may be long and cylindrical, as shown in this view, but in other embodiments may be of any shape, configuration and orientation, and is not limited to an elongate cylindrical rod. Indeed any weighted mass may be used without straying from the scope of this invention. The rod 10 is slideable within the central chamber 11. In most embodiments, the rod 10 is closely fit to an interior cross section of the chamber 11 so that it can freely move without excess friction, but is not a loose fit. A fluid 16 fills the remainder of the chamber 11 and fluid 16 is on both a left and right side of the rod 10. Optional springs 12 on each left and right side of the rod 10 serve to center the rod 10 when a force is not being acted on it or when the force is insufficient to overcome the force applied by the springs 12.

A left fluid flow path 22 joins the left side volume 13 of the chamber to the left of the rod 10 to the left piston housing 24, providing fluid communication between left side volume 13 and left piston housing 24. Similarly, a right fluid flow path 27 joins the right side volume 14 of the chamber 11 on the right of the rod 10 to right piston housing 29 providing fluid communication between right side volume 14 and right piston housing 29. The flow paths 22, 27 are any passageway providing fluid communication, but typically are piping, a hose, tube, channel, and the like.

As discussed above, and as can be seen in the figures, upon application of a side to side force against the rod 10 such as by the vehicle moving in a non-linear direction by centrifugal force, the rod will apply force to the fluid in the left or right volumes 13, 14. This force will then be transferred, among other places, to the piston head 26 on the corresponding side. In turn, the piston head 26 is urged upwards, transferring the force via left or right piston 23, 30, to the vehicle frame 31.

An upper reservoir 15 is positioned near the central chamber 11 and is in fluid communication with the left volume 14 via port 17, and in fluid communication with the right volume 14 via right access port 18. In this embodiment, the reservoir 15 is positioned above the central chamber 11, but may be alternatively positioned without straying from this invention. In this view, reservoir 15 is connected to vehicle frame by column 19. Central chamber 11 is also, in this embodiment, connected to the vehicle frame 31 by columns 19. Fluid 16 in reservoir 15 acts as an additional fluid supply to ensure that the working fluid spaces are filled, and also acts to provide a positive pressure (via gravity and internal gas pressure in the reservoir) to aid in filling the spaces within the system with fluid.

Figure 2:
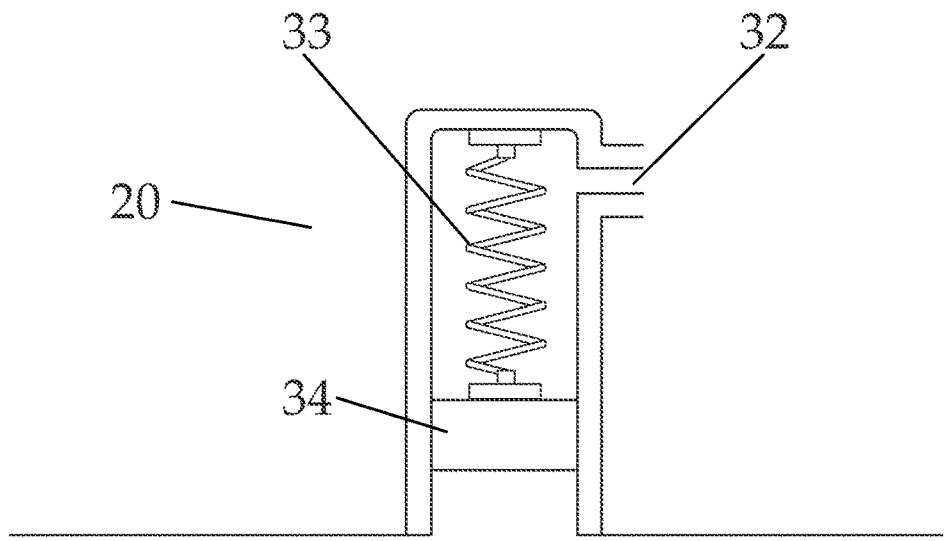
FIG. 2 provides a view of a pressure valve of an embodiment of the suspension system disclosed herein.

The reservoir 15 is equipped with a pressure regulating value 20. As detailed in FIG. 2, the pressure regulating value 20 operates to maintain a fairly constant pressure within the reservoir due to variations in fluid levels and temperature. In this embodiment, the valve 20 has a weight 34 and spring 33 engaged with a housing. At a top point, with the spring compressed, is a vent 32 to atmosphere. Upon increase of an adequate pressure in the reservoir 15, the weight 34 is pushed past the vent 32, allowing gas in the reservoir 15 to vent to atmosphere, thereby reducing the pressure. As the pressure is reduced, the weight falls back down. Smaller variations in pressure are addressed by movement of the weight 34 upward and downward.

Figure 3:
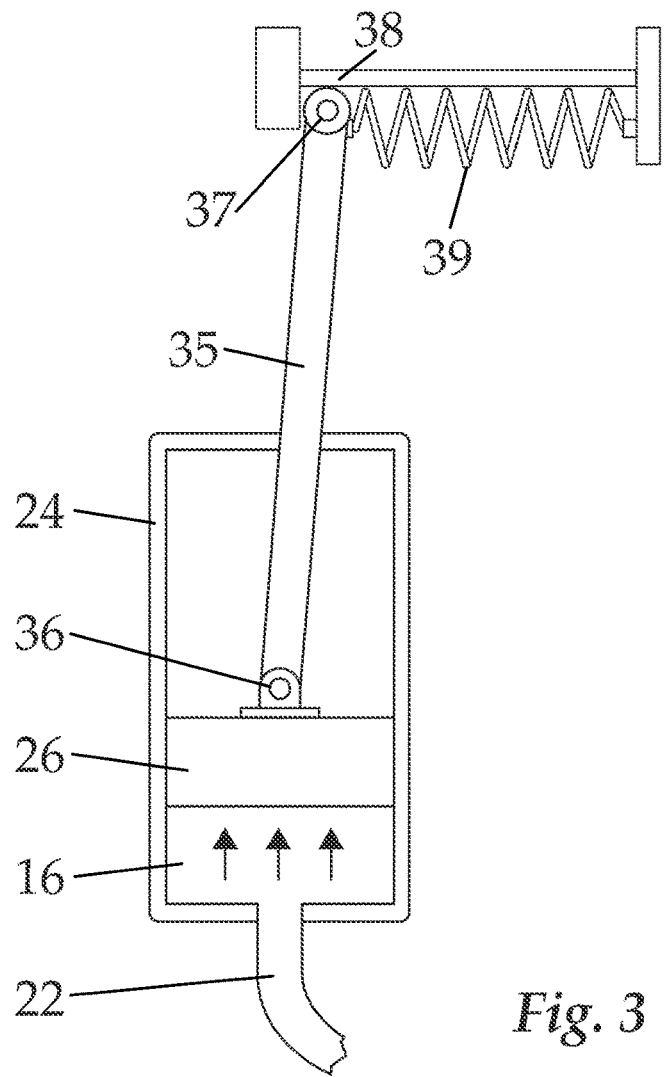
FIG. 3 provides a view of an embodiment of a piston assembly of the suspension system disclosed herein.

FIG. 3 provides a view of an embodiment of the piston housing having a pivotal piston shaft. This view may apply to both left and right piston housings. A distal end of piston shaft 35 extends out from the piston housing 24 and attaches to the vehicle frame via track 38 and wheel 37. The wheel 37 being attached to the distal end of the piston shaft 35. As such, the distal wheel 37 can slide along the path defined by track 38. Typically this is configured to cause the piston to angle inwardly toward the center of the vehicle as the piston head 26 is urged upwards. Such an orientation of angling toward the center is in opposition to the force vectors experienced by the vehicle when cornering. Of course other configurations of sliding connection between piston shaft 35 and frame are possible without straying from the scope of this invention. A spring 39 urges the wheel 37 in a direction towards the outside of the vehicle, which in turn urges piston head downward 26. The piston shaft 35 has a pivoting connection to piston head 26, such as the hinge 36 shown.

Figure 4:
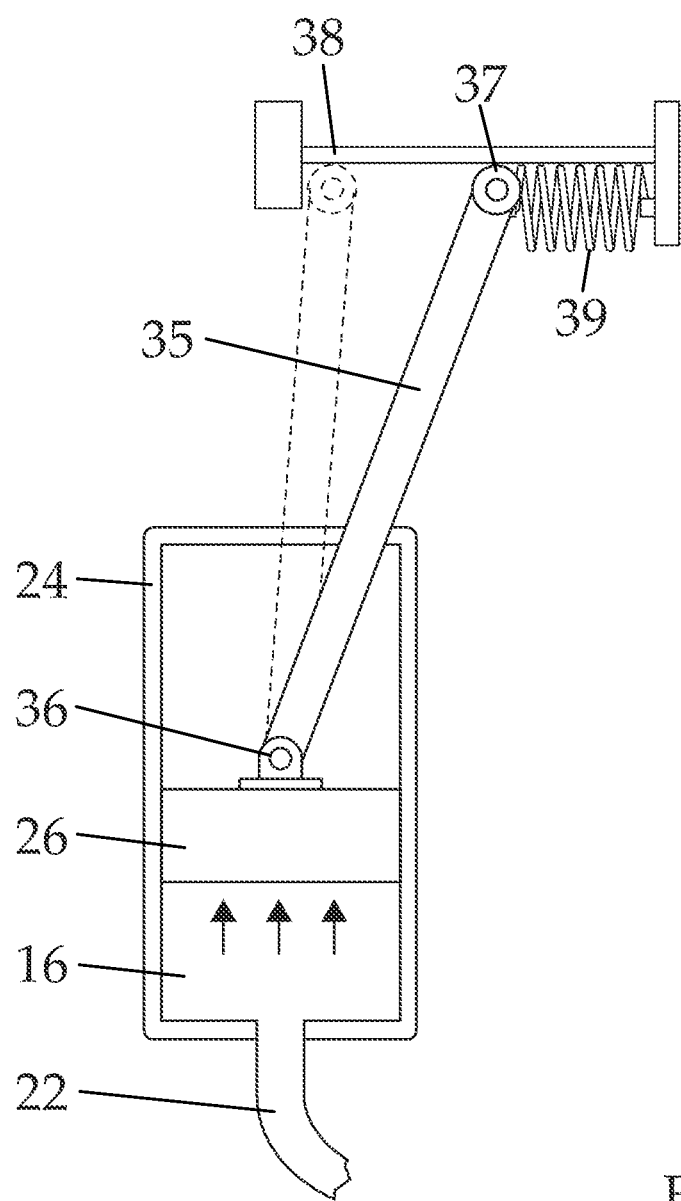
FIG. 4 provides a view of another embodiment of a piston assembly of the suspension system disclosed herein.
Figure 5:
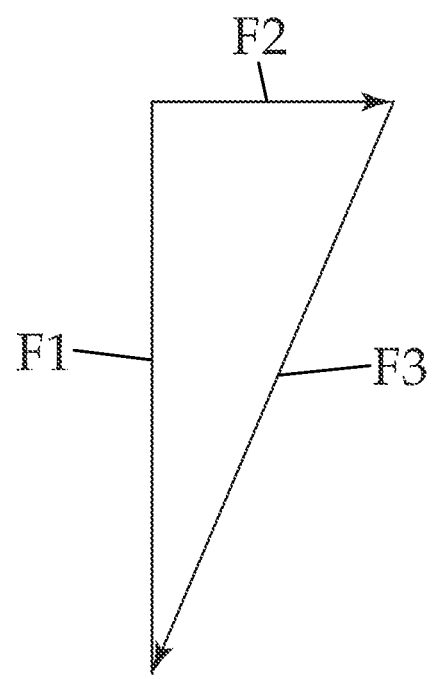
FIG. 5 provides a view of a force vectors experienced by the piston embodiment of FIG. 4.

As seen in FIGS. 4 and 5, upon application of force by fluid 16 to piston head 26, the piston head 26 moves upward. This results in a downward force F3, which can be broken down into force vectors F2 and F1. Because the force in fluid 16 has moved piston head 26 upwards, the piston shaft 35 moves in a pivoting direction about hinge 36 and wheel 37. This in turn pushes the distal end of the piston shaft 35 against the force of the spring 39 to an angled position. Such a configuration allows for a more controlled, dampened, and less direct force application on the vehicle frame. This pivoting piston shaft embodiment may be applied to any other of the embodiments disclosed herein without straying from the scope of the invention.

FIG. 6 shows another view of the system having pivoting shaft, including the central chamber and reservoir. This view shows action of the system when the vehicle wheel hits a bump in the road on the left side of the vehicle. Upon hitting a bump in the road, the wheel tends to move upward. The energy from the wheel is transferred to the axle 25 and in turn the piston housing which is attached to the axle by brackets 62 and bolts 61. The energy is dissipated partially as heat, partially as a force pushing the piston head 26 upward as indicated by arrows, and partly as a force pushing the rod 10 to the right. This rightward movement opens left access port 17 and pushes fluid up into the reservoir 15. Much of the force will be imparted to the fluid 16 in the reservoir which will increase the pressure in the tank and act on the pressure controlling valve 20. Also, movement of the rod 10 to the right will apply an upward force to the opposing side piston. As configured, this fluid flow has a dampening effect on the movements of the wheels, and may replace or augment the conventional shock absorbers used in conventional suspension systems.

It may be advantageous to use more compressible fluids, or air, nitrogen, or other gases, to replace the hydraulic fluid used in many embodiments of the system, in order to enhance the shock absorbing effect. If the variable factors controlling the pressures on the pistons are adjusted properly, the coil springs may also be eliminated.

The system may also be designed so that it is incorporated into the cooling system, in which the hydraulic fluid is replaced with a mixture of water and ethylene glycol.

While several variations of the present disclosure have been illustrated by way of example in preferred or particular embodiments, it is apparent that further embodiments could be developed within the spirit and scope of the present disclosure, or the inventive concept thereof. However, it is to be expressly understood that such modifications and adaptations are within the spirit and scope of the present disclosure, and are inclusive, but not limited to the following appended claims as set forth.

What is claimed is:

1. A vehicle suspension system comprising:
   a left piston assembly and a right piston assembly, the left piston assembly comprising a housing and a piston movable within the housing, the right piston assembly comprising a housing and a piston movable within the housing;
   a central chamber in fluid communication with the left piston housing and right piston housing, a rod positioned within the central chamber and movable laterally towards the left piston assembly and right piston assembly;
   a right side fluid flow path connecting the central chamber to the right piston housing, a fluid at least partially filling the right side fluid flow path;
   a left side fluid flow path connecting the central chamber to the left piston housing, a fluid at least partially filling the left side fluid flow path; and
   wherein upon application of a lateral force, the rod applies a force to one of the right side fluid flow path or the left side fluid flow path, the force causing the fluid having force applied to apply a force to the corresponding left or right side piston within the left or right side piston housing;
   an upper fluid reservoir, the upper fluid reservoir positioned above the central chamber, the upper fluid reservoir being in fluid communication with the central chamber on a first side adjacent to the left side fluid flow path, and in fluid communication with the central chamber on a right side adjacent to the right side fluid flow path;
   wherein the upper fluid reservoir comprises a constant pressure valve comprising a weight and a spring, the constant pressure valve operable to keep a pressure in the upper fluid reservoir consistent;
   wherein the constant pressure valve further comprises a housing, the spring engaged with a top point in the housing.

2. The vehicle suspension system of claim 1 wherein the force applied to the one of the left and right pistons urges the one of the left and right pistons upwards.

3. The vehicle suspension system of claim 1 wherein the reservoir further comprises the fluid in the right side fluid flow path and left side fluid flow path, the right side fluid flow path, left side fluid flow path, and reservoir in fluid communication with each other.

4. The vehicle suspension system of claim 1 wherein a cross section of the rod is a same shape as a cross section of an inner diameter of the central chamber, and wherein the cross section of the rod is slightly smaller than the cross section of the inner diameter of the central chamber.

5. The vehicle suspension system of claim 1 wherein the central chamber comprises a first spring engaged with a first wall of the chamber and a first lateral end of the rod, and a second spring engaged with a second wall of the chamber and a second lateral end of the rod, the first spring and second spring urging the rod to a middle of the chamber.

6. The vehicle suspension system of claim 1 wherein the fluid is a liquid.

7. The vehicle suspension system of claim 1 wherein at least one of the left and right piston housings comprises a valve vented to atmosphere to release a pressure within the at least one of the left and right piston housings.

8. The vehicle suspension system of claim 1 wherein the fluid is a liquid.

9. A vehicle suspension system comprising:
   a left piston assembly and a right piston assembly, the left piston assembly comprising a housing and a piston movable within the housing, the right piston assembly comprising a housing and a piston movable within the housing;
   a central chamber in fluid communication with the left piston housing and right piston housing, a rod positioned within the central chamber and movable laterally towards the left piston assembly and right piston assembly;
   a right side fluid flow path connecting the central chamber to the right piston housing, a fluid at least partially filling the right side fluid flow path;
   a left side fluid flow path connecting the central chamber to the left piston housing, a fluid at least partially filling the left side fluid flow path; and
   wherein upon application of a lateral force, the rod applies a force to one of the right side fluid flow path or the left side fluid flow path, the force causing the fluid having force applied to apply a force to the corresponding left or right side piston within the left or right side piston housing;

wherein a distal end of each of the left side piston and right side piston extends outwardly from the corresponding piston housing, the left side piston distal end pivotable about a head of the piston, the distal end of the left side piston attachable to a vehicle body such that upon an upward movement of the left side piston head, the distal end pivots inward towards the central chamber, and the right side piston distal end pivotable about a head of the piston, the distal end of the right side piston attachable to a vehicle body such that upon an upward movement of the right side piston head, the distal end pivots inward towards the central chamber.

10. A vehicle comprising a suspension system allowing movement of wheels of the vehicle relative to a body of the vehicle, the suspension system comprising:

a left piston assembly and a right piston assembly, the left piston assembly comprising a housing and a piston movable within the housing, the right piston assembly comprising a housing and a piston movable within the housing;

a central chamber in fluid communication with the left piston housing and right piston housing, a rod positioned within the central chamber and movable laterally towards the left piston assembly and right piston assembly;

a right side fluid flow path connecting the central chamber to the right piston housing, a fluid at least partially filling the right side fluid flow path;

a left side fluid flow path connecting the central chamber to the left piston housing, a fluid at least partially filling the left side fluid flow path; and wherein upon application of a lateral force, the rod applies a force to one of the right side fluid flow path or the left side fluid flow path, the force causing the fluid having force applied to apply a force to the corresponding left or right side piston within the left or right side piston housing;

an upper fluid reservoir, the upper fluid reservoir positioned above the central chamber, the upper fluid reservoir being in fluid communication with the central chamber on a first side adjacent to the left side fluid flow path, and in fluid communication with the central chamber on a right side adjacent to the right side fluid flow path;

wherein the upper fluid reservoir comprises a constant pressure valve comprising a weight and a spring, the constant pressure valve operable to keep a pressure in the upper fluid reservoir consistent;

wherein the constant pressure valve further comprises a housing, the spring engaged with a top point in the housing.

11. The vehicle of claim 10 wherein the force applied to the one of the left and right pistons urges the one of the left and right pistons upwards.

12. The vehicle of claim 10 wherein the reservoir further comprises the fluid in the right side fluid flow path and left side fluid flow path, the right side fluid flow path, left side fluid flow path, and reservoir in fluid communication with each other.

13. The vehicle of claim 10 wherein a cross section of the rod is a same shape as a cross section of an inner diameter of the central chamber, and wherein the cross section of the rod is slightly smaller than the cross section of the inner diameter of the central chamber.

14. The vehicle of claim 10 wherein the central chamber comprises a first spring engaged with a first wall of the chamber and a first lateral end of the rod, and a second spring engaged with a second wall of the chamber and a second lateral end of the rod, the first spring and second spring urging the rod to a middle of the chamber.

15. The vehicle suspension system of claim 10 wherein at least one of the left and right piston housings comprises a valve vented to atmosphere to release a pressure within the at least one of the left and right piston housings.

16. The vehicle of claim 10 wherein a distal end of each of the left side piston and right side piston extends outwardly from the corresponding piston housing, the left side piston distal end pivotable about a head of the piston, the distal end of the left side piston attached to the vehicle body such that upon an upward movement of the left side piston head, the distal end pivots inward towards the central chamber, and the right side piston distal end pivotable about a head of the piston, the distal end of the right side piston attached to the vehicle body such that upon an upward movement of the right side piston head, the distal end pivots inward towards the central chamber.

* * * * *